(12) United States Patent
Kwon et al.

(10) Patent No.: US 10,214,304 B2
(45) Date of Patent: Feb. 26, 2019

(54) APPARATUS FOR DRIVING THREE-DIMENSIONAL MICROGRAVITY CABLE

(71) Applicant: KOREA INSTITUTE OF INDUSTRIAL TECHNOLOGY, Cheonan-si, Chungcheongnam-do (KR)

(72) Inventors: O-hung Kwon, Seoul (KR); Jae-hwan Park, Seoul (KR); Dae-hee Won, Ansan-si (KR); Jin-young Kim, Cheonan-si (KR)

(73) Assignee: Korea Institute of Industrial Technology, Cheonan-si, Chungcheongnam-do (KR)

(*) Notice: Subject to any disclaimer, the term of this patent is extended or adjusted under 35 U.S.C. 154(b) by 38 days.

(21) Appl. No.: 15/575,402

(22) PCT Filed: Dec. 9, 2015

(86) PCT No.: PCT/KR2015/013468
§ 371 (c)(1),
(2) Date: Nov. 20, 2017

(87) PCT Pub. No.: WO2016/153147
PCT Pub. Date: Sep. 29, 2016

(65) Prior Publication Data
US 2018/0134420 A1 May 17, 2018

(30) Foreign Application Priority Data
Mar. 26, 2015 (KR) .................. 10-2015-0042229

(51) Int. Cl.
*B64G 7/00* (2006.01)
*F16M 11/18* (2006.01)
(Continued)

(52) U.S. Cl.
CPC ............. *B64G 7/00* (2013.01); *B66C 13/08* (2013.01); *F16H 7/08* (2013.01); *F16H 7/18* (2013.01);
(Continued)

(58) Field of Classification Search
CPC ......... B66C 13/06; B66C 13/08; B66C 21/00; B64G 7/00; F16H 7/08; F16H 7/18;
(Continued)

(56) References Cited

U.S. PATENT DOCUMENTS 3,626,703 A * 12/1971 Richburg .............. B63C 7/16
114/312
4,928,925 A * 5/1990 Christison ........... B63B 23/50
254/264
(Continued)

FOREIGN PATENT DOCUMENTS

| CN | 102526947 A | 7/2012 |
|---|---|---|
| JP | 2006-224202 A | 8/2006 |

(Continued)

*Primary Examiner* — Michael E Gallion
(74) *Attorney, Agent, or Firm* — Rabin & Berdo, P.C.

(57) ABSTRACT

The technical objective of the present disclosure is to provide an apparatus for driving a three-dimensional microgravity cable that can reproduce microgravity environments such as those experienced on the moon or Mars. To this end, the apparatus for driving a three-dimensional microgravity cable of the present disclosure comprises: a frame unit for forming a virtual space; a wire unit comprising three or more wires, provided at the frame unit; a winch unit for winding or unwinding each of the three or more wires; tension measuring units, respectively provided at the three or more wires, for measuring the tensions of the respective wires; a position sensing unit, provided at the frame unit, for sensing (Continued)

the position of a participant; and a support unit, positioned in the virtual space, for supporting the participant by the three or more wires.

5 Claims, 4 Drawing Sheets

(51) Int. Cl.
*B66C 13/08* (2006.01)
*F16H 7/08* (2006.01)
*F16H 7/18* (2006.01)
*F16H 19/06* (2006.01)
*F16M 11/42* (2006.01)
*G09B 9/00* (2006.01)

(52) U.S. Cl.
CPC ............ *F16H 19/06* (2013.01); *F16M 11/18* (2013.01); *F16H 2007/0808* (2013.01); *F16M 11/425* (2013.01); *G09B 9/00* (2013.01)

(58) Field of Classification Search
CPC ... F16H 19/06; F16H 2007/0808; G09B 9/00; F16M 11/18; F16M 11/425
See application file for complete search history.

(56) References Cited

U.S. PATENT DOCUMENTS

| | | | | |
|---|---|---|---|---|
| 5,224,426 A * | 7/1993 | Rodnunsky | ............... | B61B 7/00 104/112 |
| 5,568,189 A * | 10/1996 | Kneller | .................. | H04N 5/222 248/58 |
| 5,585,707 A * | 12/1996 | Thompson | ................ | B25J 5/00 318/568.1 |
| 6,152,854 A | 11/2000 | Carmein | | |
| 6,439,407 B1 * | 8/2002 | Jacoff | ..................... | B66C 13/06 212/272 |
| 6,566,834 B1 * | 5/2003 | Albus | .................... | B25J 9/1623 318/566 |
| 6,809,495 B2 * | 10/2004 | Rodnunsky | ............. | B66C 13/08 104/180 |
| 6,826,452 B1 * | 11/2004 | Holland | .................. | B66C 1/663 318/566 |
| 6,873,355 B1 * | 3/2005 | Thompson | ............. | F16M 11/18 348/144 |
| 6,991,064 B2 * | 1/2006 | Ehrenleitner | .......... | B62D 65/18 182/141 |
| 7,284,744 B1 * | 10/2007 | Lerchenmueller | ...... | B66C 13/06 254/278 |
| 7,625,314 B2 * | 12/2009 | Ungari | ............... | A63B 69/0053 482/1 |
| 7,753,642 B2 * | 7/2010 | Bosscher | ............. | B25J 17/0266 414/735 |
| 8,199,197 B2 * | 6/2012 | Bennett | ................ | F16M 11/105 348/144 |
| 9,010,733 B2 * | 4/2015 | Kwon | ...................... | B66D 1/48 254/278 |
| 9,063,390 B2 * | 6/2015 | Wharton | ................ | G03B 15/00 |
| 9,457,473 B2 * | 10/2016 | Rudakevych | .......... | B25J 9/1697 |
| 9,908,750 B2 * | 3/2018 | Sturm, Jr. | ............... | B66C 11/08 |
| 10,016,891 B2 * | 7/2018 | Reid | ...................... | B25J 9/0078 |
| 10,103,813 B2 * | 10/2018 | Wharton | ................ | H04J 14/02 |
| 10,112,118 B2 * | 10/2018 | Davis | ..................... | A63G 31/00 |
| 2005/0024005 A1 * | 2/2005 | Rodnunsky | ............. | B66C 13/08 318/649 |
| 2005/0185089 A1 * | 8/2005 | Chapman | ................ | F16M 11/10 348/375 |
| 2005/0191050 A1 * | 9/2005 | Chapman | ................ | B60R 11/04 396/428 |
| 2007/0047949 A1 * | 3/2007 | Gluck | ..................... | G03B 15/00 396/427 |
| 2007/0064208 A1 * | 3/2007 | Giegerich | .............. | F16M 11/18 353/122 |
| 2008/0128668 A1 * | 6/2008 | Fofonoff | ................. | B66C 13/08 254/334 |
| 2009/0066100 A1 * | 3/2009 | Bosscher | ............. | B25J 17/0266 294/86.4 |
| 2009/0207250 A1 * | 8/2009 | Bennett | ................ | F16M 11/105 348/144 |
| 2011/0204197 A1 * | 8/2011 | Wharton | ................ | G03B 15/00 248/323 |
| 2012/0298937 A1 * | 11/2012 | Fisher | ..................... | B66C 11/16 254/283 |
| 2013/0087751 A1 * | 4/2013 | Kwon | ...................... | B66D 1/48 254/268 |
| 2013/0146826 A1 * | 6/2013 | Oscar | ....................... | H02G 1/06 254/134.3 CL |
| 2013/0238135 A1 * | 9/2013 | Fisher | ..................... | B66C 21/00 700/275 |
| 2015/0041580 A1 * | 2/2015 | Maas | ...................... | G01V 1/168 242/403 |
| 2015/0217975 A1 * | 8/2015 | Khajepour | ............. | B25J 9/0078 254/292 |
| 2017/0233228 A1 * | 8/2017 | Coners | .................... | B66C 13/46 29/889.21 |
| 2018/0023354 A1 * | 1/2018 | Dion | ....................... | G05B 15/02 166/363 |
| 2018/0134420 A1 * | 5/2018 | Kwon | ...................... | F16H 7/08 |

FOREIGN PATENT DOCUMENTS

KR        10-1137722 B1     4/2012
KR    10-2014-0040490 A    4/2014

\* cited by examiner

APPARATUS FOR DRIVING THREE-DIMENSIONAL MICROGRAVITY CABLE

TECHNICAL FIELD

The present disclosure relates to an apparatus for driving a cable, which is configured for implementing a virtual reality in a virtual space.

BACKGROUND ART

In general, virtual reality is one of user interface technologies that allows a user wearing special glasses or the like to experience what is possible inside the software program of a computer as if he or she is experiencing it in real life through the human sense such as vision, hearing, or the like.

In order to realize this technology, a treadmill or the like may be used for providing a participant of the virtual reality with actual walking or running motion.

However, although it is possible to realize the actual walking or running motion of the participant, it is not possible to realize certain environment such as microgravity environments such as those on the moon or Mars. For reference, an environment is usually said to have the 'microgravity' when it has a gravity but that gravity is so weak to a negligible extent.

Prior art document: U.S. Pat. No. 6,152,854 (Nov. 28, 2000)

DISCLOSURE

Technical Problem

A technical object of the present disclosure is to provide an apparatus for driving a three-dimensional microgravity cable, which can reproduce microgravity environments such as those on the moon or Mars.

It is another object of the present disclosure to provide an apparatus for driving a three-dimensional microgravity cable, which can minimize a shaking phenomenon that can be generated when a participant is performing horizontal and vertical movements in the microgravity condition.

Technical Solution

According to an aspect of the present disclosure, there is provided an apparatus for driving a three-dimensional microgravity cable, which may include: a frame unit for forming a virtual space; a wire unit including three or more wires, provided at the frame unit; a winch unit for winding or unwinding each of the three or more wires; tension measuring units, respectively provided at the three or more wires, for measuring the tensions of the respective wires; a position sensing unit, provided at the frame unit, for sensing the position of a participant; a support unit, positioned in the virtual space, for supporting the participant with the three or more wires; and a control unit for controlling the tension of the wire unit by driving the winch unit, in which the control unit controls so that the sum of the forces in the vertical direction of the tension applied to the wire unit can be smaller than the load of the participant.

The support unit may include a support stand suspended by the three or more wires; and a gripping unit provided at a lower portion of the support stand to grip the participant.

The gripping unit may include a connecting bar rotatably provided at a lower portion of the support stand; and a holder rotatably provided on the connecting bar to grip the participant.

The supporting unit may further include a tilt compensation unit for compensating the tilt of the support stand so that a bottom surface of the support stand is parallel to a bottom surface of the virtual space.

The tilt compensation unit may include a tilt measuring unit that measures a tilt of the support stand; a length adjusting member provided on an upper portion of the support stand and adjustable in length; and a weight provided to an end of the length adjusting member.

The length adjusting member may be adjusted in length so as to satisfy the following equation:

$$(I_b + I_a)\ddot{\theta} = m_a r_a \sin\theta - m_b r_b \sin\theta + m_a r_a \cos\theta - m_b r_b \cos\theta$$

where, $m_a$ is the weight of the participant, $m_b$ is the weight of the weight, $\theta$ is the tilt of the support stand, $r_a$ is the distance from the support stand to the center of gravity of the participant, $r_b$ is the distance from the support stand to the center of weight of the weight, $I_a$ is the moment of inertia of the participant, and $I_b$ is the moment of inertia of the weight.

Further, the length adjusting member is adjusted in its length by a linear actuator method or a telescopic method.

In addition, the length adjusting member may be connected to the support stand by a universal joint method.

Advantageous Effects

The present disclosure gives the following effects. As described above, an apparatus for driving the three-dimensional microgravity cable according to exemplary embodiments of the present disclosure may provide the following effects.

According to an embodiment of the present disclosure, a technical configuration is provided, which includes the frame unit the wire unit the winch unit, the tension measuring unit the position sensing unit and the support unit and which can thus realize the microgravity environment such as that on the moon or Mars in the virtual space by controlling the difference between the first value measured by the tension measuring unit and the second value that is calculated for the required tension for respective wires of the wire unit from the load and position of the participant.

According to the embodiment of the present disclosure, with the tilt compensation unit provided, the length of respective wires can be adjusted by the winch unit such that the shaking of the support stand can be minimized even when the support stand is subjected to horizontal or vertical force.

* Description of reference numerals

| | |
|---|---|
| 100: Apparatus for driving a three-dimensional microgravity cable | |
| 110: Frame unit | 111: Vertical frame |
| 112: Horizontal frame | 120: Wire |
| 130: Winch unit | 140: Tension measuring unit |
| 150: Position sensing unit | 160: Supporting unit |
| 161: Support stand | 162: Gripping unit |
| 162a: Connecting bar | 162b: Holder |
| 163: Tilt compensation unit | 163a: Tilt measuring unit |
| 163b: Length adjusting member | 163c: weight |

BEST MODE

Hereinafter, preferred embodiments of the present disclosure will be described in detail with reference to the accompanying drawings. However, the description proposed herein is just a preferable example for the purpose of illustrations only, and not intended to limit the scope of the disclosure.

Figure 1A:
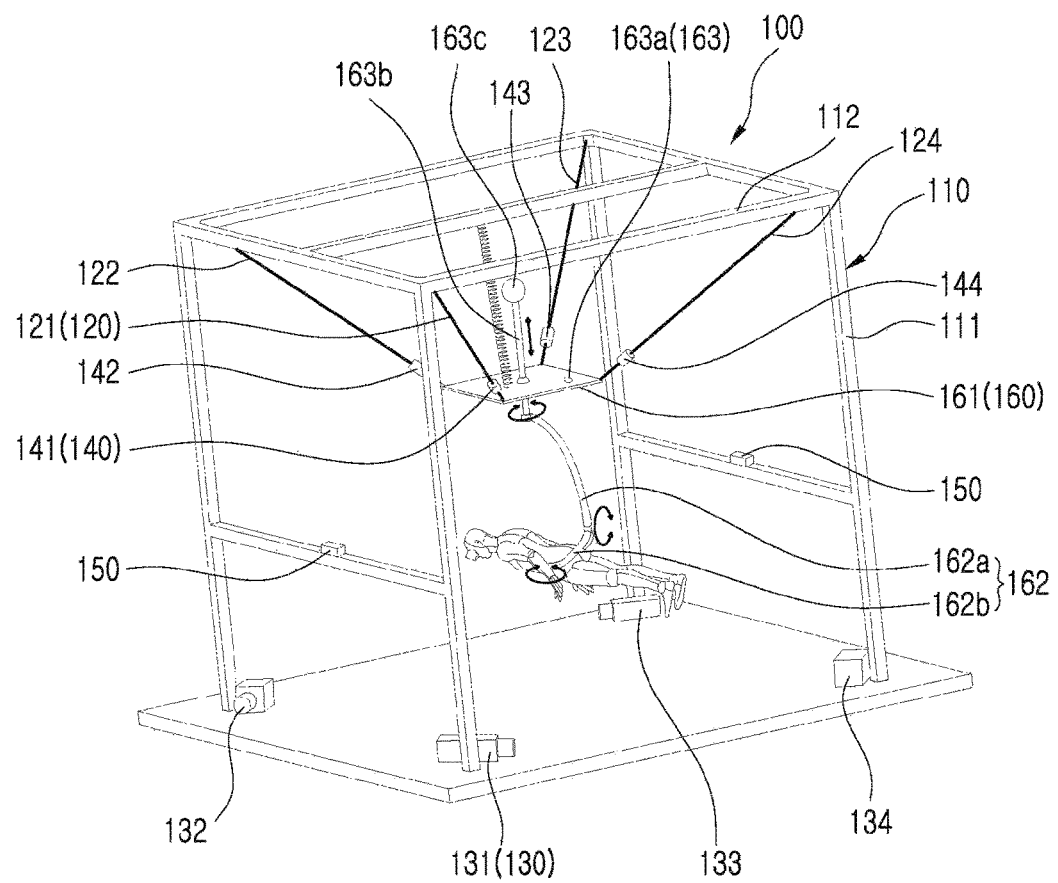
FIG. 1A is a perspective view schematically showing an apparatus for driving a three-dimensional microgravity cable according to an embodiment of the present disclosure.
Figure 1B:
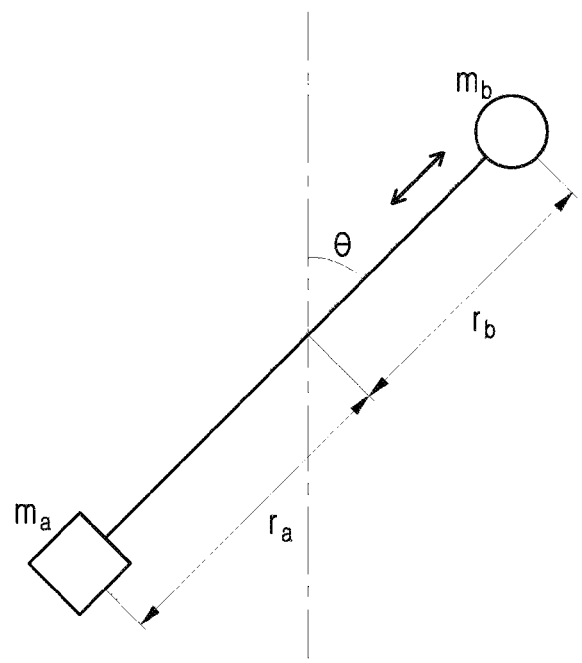
FIG. 1B is a view provided to explain a tilt compensation unit of the apparatus for driving the three-dimensional microgravity cable of FIG. 1A.

FIG. 1A is a perspective view schematically showing an apparatus for driving a three-dimensional microgravity cable according to an embodiment of the present disclosure, and FIG. 1B is a view provided to explain a tilt compensation unit of the apparatus for driving the three-dimensional microgravity cable of FIG. 1A.

As shown in FIG. 1A, an apparatus 100 for driving a three-dimensional microgravity cable according to an embodiment of the present disclosure includes a frame unit 110, a wire unit 120, a winch unit 130, a tension measuring unit 140, a position sensing unit 150, and a supporting unit 160. Hereinafter, each of the elements will be described in detail with continued reference to FIG. 1.

The frame unit 110 forms a virtual space, and can provide a virtual space therein with the combination of a vertical frame 111 and a horizontal frame 112.

The wire unit 120 includes first, second, third and fourth wires 121, 122 and 123 arranged at about 90-degree intervals from each other with reference to the support stand (not illustrated). Each wire of the wire unit 120 may be connected to first, second, third and fourth winches 131 132 133 134 (i.e., the winch unit 130) provided on a bottom surface, respectively, through the inside of the vertical frames 111 placed in the corresponding positions, respectively.

The winch unit 130 may be provided to wind or unwind respective wires of the wire unit 120 and may include first, second, third and fourth winches 131, 132, 133 and 134 to wind or unwind the wires, respectively, when the wire unit 120 includes first, second, third and fourth wires 121, 122, 123 and 124. The winch unit 130 independently wind or unwind the respective wires of the wire unit 120 to apply horizontal force or vertical force to the support stand on which the participant is suspended.

The tension measuring unit 140 measures the tensile force of respective wires of the wire unit 120 and in an example in which the wire unit 120 includes the first, second, third and fourth wires 121, 122, 123, and 124, the tension measuring unit 140 may include first, second, third and fourth force sensors 141, 142, 143 and 144 to measure the tension of the wires 121, 122, 123, and 124, respectively.

The position sensing unit 150 may be provided in the frame unit 110 to sense the position of the participant. For example, the position sensing unit 150 may be a visual sensor.

The support unit 160 is positioned in the virtual space and serves as a medium for supporting the participant with three or more wires of the wire unit 120.

Accordingly, with the provision of the frame unit 110, the wire unit 120, the winch unit 130, the tension measuring unit 140, the position sensing unit 150, and the support unit 160 described above, a microgravity environment such as that on the moon or Mars can be realized in the virtual space by controlling the difference between the first value measured by the tension measuring unit 140 and the second value that is calculated for the required tension for respective wires of the wire unit 120 from the load and position of the participant.

That is, the participant is enabled to feel like he or she is actually jumping, walking, running, and spinning in a microgravity environment such as that on the Moon or Mars. For example, when the participant wants to experience the microgravity environment of the Moon (for reference, the Moon's gravity is known to be about $1/6$ of the Earth's gravity), the sum of the forces in the vertical direction of the tensile forces of the first, second, third and fourth wires 121, 122, 123 and 124 as $5/6$ of the participant's load can be applied. This can be accomplished as a control unit (not shown) adjusts the tension of the wire of the wire unit 120 through the winch.

Hereinafter, referring back to FIG. 1A, the support unit 160 will be described in more detail.

The support unit 160 may include a support stand 161 and a gripping unit 162, as shown in FIG. 1A.

The support stand 161 is hung by three or more wires of the wire unit 120 and in an example when the wire unit 120 includes first, second, third and fourth wires 121, 122, 123 and 124, the support stand 161 may be hung as the respective wires 121, 122, 123 and 124 of the wire unit 120 are positioned on the edges of the support stand 161.

The gripping unit 162 is provided at a lower portion of the support stand 161 to grip the participant and may include a connecting bar 162a and a holder 162b. The connecting bar 162a may be rotatably provided at a lower portion of the support stand 161 through a rotary joint, and the holder 162b to directly grip the participant may be rotatably provided on the connecting bar 162a through a rotary joint.

In addition, the supporting unit may further include a tilt compensation unit 163 as shown in FIG. 1A.

When the lengths of the respective wires of the wire unit 120 are adjusted by the winch unit 130 so that the support stand 161 is subjected to a force in the horizontal direction or the vertical direction, the support stand 161 may be shaken. Accordingly, by adjusting the tilt of the support stand 161 so that the bottom surface of the support stand 161 remains parallel to the bottom surface of the virtual space, the tilt compensation unit 163 plays a role of preventing the support stand 161 from shaking. For example, the tilt compensation unit 163 may include a tilt measuring unit 163a, a length adjusting member 163b, and a weight 163c, as shown in FIG. 1.

The tilt measuring unit 163a, which is provided to measure the tilt of the support stand 161, may be provided on the support stand 161. The length adjusting member 163b is adjustable in its length and may be provided on an upper portion of the support stand 161. For example, the length adjusting member 163b may use a telescopic method, a linear actuator method, or the like for adjusting the length thereof, and may be likewise controlled through a control unit. In addition, the length adjusting member 163b may be connected to the support stand 161 with a universal joint method. The weight 163c may be set at the minimum weight of the participant and may be provided at an end of the length adjusting member 163b.

Accordingly, with the tilt measuring unit 163a, the length adjusting member 163b, and the weight 163c provided as described above, when a horizontal or vertical force is applied to the support stand 161 on which the participant is suspended, the support stand 161 is prevented from shaking due to occurrence of a phenomenon in which the support stand 161 is tilted by the participant trying to stay in place. For example, as shown in FIG. 1B, when the tilt measuring unit 163a senses the tilting of the support stand 161, the length of the length adjusting member 163b may be adjusted to satisfy the following equation:

$$(I_b+I_a)\ddot{\theta}=m_a r_a \sin\theta - m_b r_b \sin\theta + m_a r_a \cos\theta - m_b r_b \cos\theta \quad \text{(equation)}$$

where, $m_a$ is the weight of the participant, $m_b$ is the weight of the weight, $\theta$ is the tilt of the support stand, $r_a$ is the distance from the support stand to the center of gravity of the participant, $r_b$ is the distance from the support stand to the center of weight of the weight, $I_a$ is the moment of inertia of the participant, and $I_b$ is the moment of inertia of the weight.

Accordingly, by adjusting the length of the length adjusting member 163b perpendicularly to the ground surface, the effect of auto-balancing can be achieved. Meanwhile, if the weight ($m_a$) of the participant and the weight ($m_b$) of the weight are the same, it would be sufficient to adjust the length so as to equalize the length ($r_a$) of the gripping unit and the length ($r_b$) of the length adjusting member, but it is more reasonable to make the weight of the weight heavier to reduce the tilt while minimizing the variation in length, because there is a limit to making the weight of the participant equal or approximate to the weight of the weight.

Figure 2:
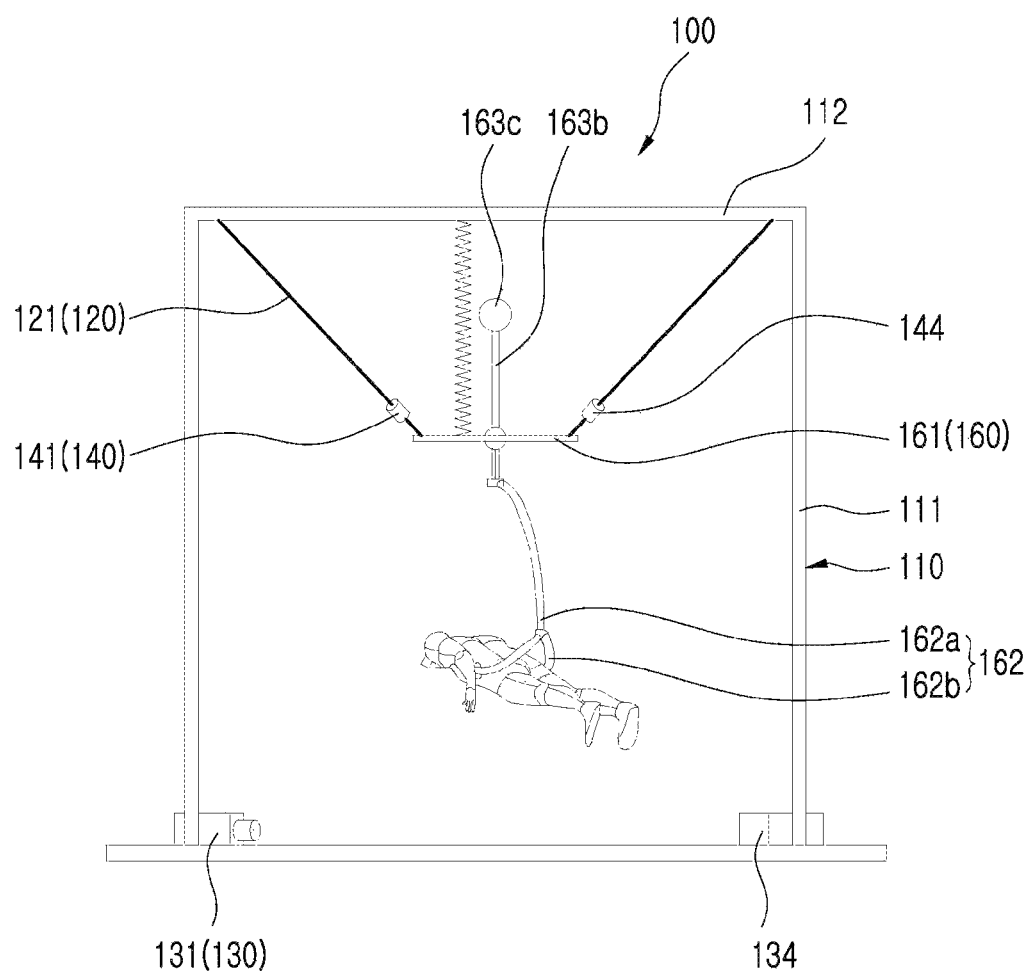
FIG. 2 is a side view showing a participant suspended in a tilted position toward the ground on a holder of an apparatus for driving the three-dimensional microgravity cable of FIG. 1A.
Figure 3:
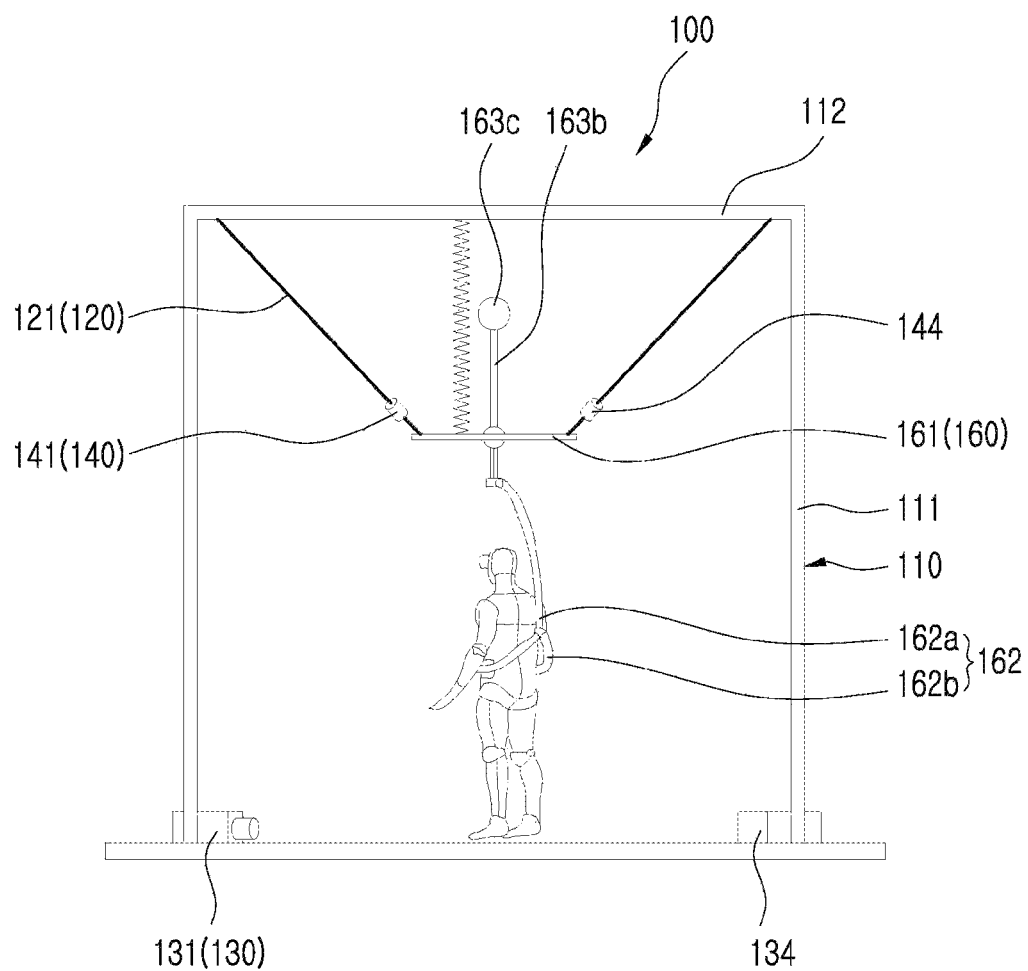
FIG. 3 is a side view showing a participant suspended in an upright position on a holder of the apparatus for driving the three-dimensional microgravity cable of FIG. 1A.

For reference, FIG. 2 is a view showing a participant suspended in a tilted position toward a floor surface on a holder 162b of the apparatus 100 for driving three-dimensional microgravity cable of FIG. 1. FIG. 3 is a view showing a participant suspended in an upright position on the holder of the apparatus for driving the three-dimensional microgravity cable of FIG. 1A.

As described above, the apparatus 100 for driving three-dimensional microgravity cable according to an embodiment of the present disclosure can provide the following effects.

According to an embodiment of the present disclosure, a technical configuration is provided, which includes the frame unit 110, the wire unit 120, the winch unit 130, the tension measuring unit 140, the position sensing unit 150, and the support unit 160, and which can thus realize the microgravity environment such as that on the moon or Mars in the virtual space by controlling the difference between the first value measured by the tension measuring unit 140 and the second value that is calculated for the required tension for respective wires of the wire unit 120 from the load and position of the participant.

According to an embodiment of the present disclosure, with the tilt compensation unit 163 provided, the lengths of the respective wires of the wire unit 120 are adjusted by the winch unit 130 such that shaking of the support stand 161 can be controlled at a minimum extent even when the support stand 161 is subjected to horizontal or vertical force.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

Since the present disclosure relates to an apparatus for driving a three-dimensional microgravity cable, the present disclosure is able to reproduce microgravity environments such as those on the moon or Mars in a virtual space, and is thus industrially applicable.

What is claimed is:

1. An apparatus for driving a three-dimensional microgravity cable, comprising:
    a frame unit for forming a virtual space;
    a wire unit comprising three or more wires, provided at the frame unit;
    a winch unit for winding or unwinding each of the three or more wires;
    tension measuring units, respectively provided at the three or more wires, for measuring the tensions of the respective wires;
    a position sensing unit, provided at the frame unit, for sensing the position of a participant;
    a support unit, positioned in the virtual space, for supporting a participant by the three or more wires;
    and a control unit for controlling the tension of the wire unit by driving the winch unit;
    wherein the control unit controls so that the sum of the forces of the tension acting on the wire unit in the vertical direction of the ground is smaller than the load of the participant; wherein the support unit comprises a support stand suspended by the three or more wires; and a gripping unit provided at a lower portion of the support stand to grip the participant; wherein the support unit further comprises a tilt compensation unit for compensating the tilt of the support stand so that a bottom surface of the support stand is parallel to a bottom surface of the virtual space; wherein the tilt compensation unit comprises a tilt measuring unit for measuring the tilt of the support stand; a length adjusting member provided on the upper portion of the support stand and adjustable in length; and a weight provided at an end of the length adjusting member.

2. The apparatus of claim 1, wherein the gripping unit comprises a connecting bar rotatably provided at a lower portion of the support stand; and a holder rotatably provided on the connecting bar to grip the participant.

3. The apparatus of claim 1, wherein the length adjusting member is adjusted in the length thereof to satisfy equation:

$$(I_b+I_a)\ddot{\theta}=m_a r_a \sin\theta - m_b r_b \sin\theta + m_a r_a \cos\theta - m_b r_b \cos\theta$$

where, $m_a$ is the weight of the participant, $m_b$ is the weight of the weight, $\theta$ is the tilt of the support stand, $r_a$ is the distance from the support stand to the center of gravity of the participant, $r_b$ is the distance from the support stand to the center of weight of the weight, $I_a$ is the moment of inertia of the participant, and $I_b$ is the moment of inertia of the weight.

4. The apparatus of claim 1, wherein the length adjusting member is adjusted in length by a linear actuator method or a telescopic method.

5. The apparatus of claim 1, wherein the length adjusting member is connected to the support stand by a universal joint method.

* * * * *